(12) United States Patent
Hurwitz (10) Patent No.: US 8,197,074 B2
(45) Date of Patent: Jun. 12, 2012

(54) OMNIDIRECTIONALLY REFLECTIVE BUOYANT ROPE

(75) Inventor: Marni Markell Hurwitz, Far Hills, NJ (US)

(73) Assignee: Nite Glow Industries, Inc., Far Hills, NJ (US)

( * ) Notice: Subject to any disclaimer, the term of this patent is extended or adjusted under 35 U.S.C. 154(b) by 246 days.

(21) Appl. No.: 12/583,492

(22) Filed: Aug. 21, 2009

(65) Prior Publication Data

US 2011/0043914 A1    Feb. 24, 2011

(51) Int. Cl.
*G02B 5/122* (2006.01)
(52) U.S. Cl. .............................. 359/529; 87/1; 427/163.4
(58) Field of Classification Search ............... 427/163.4; 87/1; 359/515–553
See application file for complete search history.

(56) References Cited

U.S. PATENT DOCUMENTS

| | | | |
|---|---|---|---|
| 3,176,584 A | 4/1965 | DeVries et al. | 359/539 |
| 3,190,178 A | 6/1965 | McKenzie | 359/514 |
| 4,025,159 A | 5/1977 | McGrath | 359/514 |
| 4,167,156 A | 9/1979 | Kupperman et al. | 119/795 |
| 4,576,850 A | 3/1986 | Martens | 428/156 |
| 4,582,885 A | 4/1986 | Barber | 528/28 |
| 4,593,599 A * | 6/1986 | Yeardley | 87/6 |
| 4,668,558 A | 5/1987 | Barber | 428/156 |
| 4,763,985 A | 8/1988 | Bingham | 359/518 |
| 4,815,818 A | 3/1989 | Thomas | 359/546 |
| 4,950,525 A | 8/1990 | Bailey | 428/164 |
| 4,957,335 A | 9/1990 | Kuney | 359/541 |
| 5,066,098 A | 11/1991 | Kult et al. | 359/540 |
| 5,117,304 A | 5/1992 | Huang et al. | 359/529 |
| 5,200,262 A | 4/1993 | Li | 442/379 |
| 5,237,448 A | 8/1993 | Spencer et al. | 119/792 |
| 5,243,457 A | 9/1993 | Spencer | 119/795 |
| 5,283,101 A | 2/1994 | Li | 428/141 |
| 5,777,790 A | 7/1998 | Nakajima | 359/536 |
| 5,882,796 A | 3/1999 | Wilson et al. | 428/411.1 |

(Continued)

FOREIGN PATENT DOCUMENTS

WO    WO 8801934 A  *  9/1996

OTHER PUBLICATIONS

Derwent-Acc-No. 1988-091747 (Abstracted-Pub-No. WO 8801934 A) (2011).*

*Primary Examiner* — Jennifer L. Doak
(74) *Attorney, Agent, or Firm* — Ernest D. Buff, Esq.; Ernest D. Buff and Assoc. LLC; Margaret A. LaCroin, Esq.

(57) ABSTRACT

A flexible abrasion resistant water shedding omnidirectionally reflective rope has a central low-density polymeric closed cell foam core comprising EPDM, Neoprene, SBR, NBR, EVA, PVC, PVC/NBR foam surrounded by cylindrically braided sleeve of reflective strips composed of narrow width reflective strips that comprise a woven or knitted narrow width strip and a flexible nylon retroreflective sheet sewn thereon and covered with abrasion resistant water shedding coating. The flexible retroreflective sheet is formed by thermally bonding corner cube, microsphere retroreflectors, or wide angle exposed retroreflective lenses to a flexible polymeric sheet. Due to its low-density foam core construction, the reflective rope floats on water and sheds water from the surface preserving omnidirectional reflectivity. The rope reflects light omnidirectionally over a large angle of acceptance and provides accurate illumination of the rope floating in water, location of a rope wound buoy and the like when used during dusk, fog or nighttime hours.

20 Claims, 6 Drawing Sheets

U.S. PATENT DOCUMENTS

| | | | | |
|---|---|---|---|---|
| 5,910,858 A | 6/1999 | Frey | | 359/534 |
| 5,926,314 A | 7/1999 | Smith et al. | | 359/530 |
| 5,962,108 A | 10/1999 | Nestegard et al. | | 428/172 |
| 6,159,537 A | 12/2000 | Crandall | | 427/163.4 |
| 6,355,349 B2 | 3/2002 | Chizmas | | 428/383 |
| 6,394,623 B1 | 5/2002 | Tsui | | 362/249 |
| 6,604,841 B2 | 8/2003 | Liu | | 362/252 |
| 6,677,028 B1 | 1/2004 | Lasch et al. | | 428/161 |
| 6,907,685 B1 | 6/2005 | Falkner et al. | | 40/597 |
| 6,925,965 B1 | 8/2005 | Hurwitz | | 119/793 |
| 6,953,262 B2 | 10/2005 | Cleaver et al. | | 362/219 |
| 6,965,205 B2 | 11/2005 | Piepgras et al. | | 315/318 |
| 2003/0206419 A1 | 11/2003 | Longatti et al. | | 362/551 |
| 2004/0037080 A1 | 2/2004 | Luk et al. | | 362/252 |
| 2005/0157389 A1 | 7/2005 | Shipman et al. | | 359/529 |
| 2005/0157390 A1 | 7/2005 | Weiss et al. | | 359/529 |
| 2005/0162850 A1 | 7/2005 | Luk et al. | | 362/227 |
| 2006/0021585 A1 | 2/2006 | Hurwitz | | 119/795 |
| 2006/0026933 A1 | 2/2006 | Hurwitz | | 54/24 |
| 2006/0026934 A1 | 2/2006 | Hurwitz | | 54/24 |
| 2006/0027188 A1 | 2/2006 | Hurwitz | | 119/795 |

\* cited by examiner

Fig. 6

OMNIDIRECTIONALLY REFLECTIVE BUOYANT ROPE

BACKGROUND OF THE INVENTION

1. Field of the Invention

The present invention relates to buoyant reflective materials that float on water when thrown; and, more particularly, to an abrasion resistant omnidirectionally reflective rope that reflects light back to the lighting source, and which can be thrown in the water towards a swimmer in distress from a vessel, or mark buoys or lobster traps, to increase visibility of the swimmer and buoys in the water and provide a margin of safety that reduces boating accidents during navigation in harbors under dimly lit conditions.

2. Description of the Prior Art

Boats and vessels for marine and lake use face special problems during dusk and nighttime navigation, or during fog events that limit visibility. Larger vessels and boats rely on board lighting sources to guide their way. Even then, marine craft risk collision with buoys attached to lobster traps or fishing nets. These collisions can damage smaller boats and lead to injury or loss of lives. In light of their large driving power and weight, navigation of marine craft requires precise control of a vessels speed and direction. As such, the navigator needs adequate visible clues to assess collision probabilities. Oftentimes, these visual clues are not available due to the limited range and area coverage provided by on board lighting sources.

When a swimmer is overboard, a floatation device is generally thrown and its location with respect to the swimmer is difficult to see in dimly illuminated conditions. It is also difficult to see when the swimmer in distress was able to reach the floatation device and is securely attached and can be hauled into the vessel by using a rope attached to the floatation device.

Retro-reflective reflectors are known in the art, but have not been available on rope that can be twisted and handled in a marine environment. Rope has been equipped with active powered lighting sources. Such rope is unsuited for marine craft applications due to the requirement of electrical power, which may be easily short circuited by sea water, or even lake water. In general, use of wires, bulbs, LEDS, photo-luminescent devices and other illumination sources presents extremely unreliable lighting sources, considering the abuse to which ropes are subjected in a marine craft environment. None of the prior art patents disclose an abrasion resistant omnidirectionally reflective rope suited for marine applications.

U.S. Pat. Nos. 6,394,623, 6,604,841, 6,907,685, 6,953,262 and 6,965,205, patent applications 20030206419, 20040037080, 20050162850 and 20060021585 disclose ropes with active illuminating devices such as a lamps, LEDs or electroluminescent devices that are powered by an electrical power source. These illuminated ropes do not omnidirectionally reflect light back to the source to thereby provide enhanced visibility during dusk, fog or dark surroundings. Moreover, electrical circuits used in these devices would likely be short circuited in a marine craft environment.

Numerous patents disclose reflective materials. Some of these patents disclose reflective elements having corner cube shapes embedded in rigid or flexible polymeric strips and monolayers of spherical beads, i.e. primarily glass beads bonded to a reflective sheet.

U.S. Pat. No. 3,176,584 to DeVries, et al. discloses that a reinforcing layer may be incorporated into an embedded lens retroreflective sheeting. The reinforcing layer may have a composition similar to that of the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retro-reflection. This thin fragile retro-reflection coating is unsuited for use as a rope that must withstand bending and twisting forces prevalent with marine craft applications.

U.S. Pat. No. 3,190,178 to McKenzie discloses reflex reflective sheeting. A monolayer of microspheres is embedded in a polymer to reflect the incoming light beam in the same direction as the incident beam. Since the sheet is formed by melting of the polymeric binder, it is rigid and therefore unsuitable for flexible ropes.

U.S. Pat. No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, subjected to heat and pressure to displace the binder around the embedded microsphere or corner cubes forming the bonded network. Retroreflective articles so constructed may be rigid and inflexible.

U.S. Pat. No. 4,576,850 to Martens, as well as U.S. Pat. Nos. 4,582,885 and 4,668,558 to Barber, disclose shaped plastic articles having replicated microstructure surfaces. These shaped plastic articles are made by crosslinked polymers with hard and soft segments having a microstructure-bearing surface that is replicated with a castable fluid and radiation hardened. Articles formed by this process exhibit, retro-reflective cube-corner sheeting, a Fresnel lens or a videodisc. All these formed articles are rigid and therefore unsuitable for use as ropes. Moreover, these articles also exhibit low tear strength.

U.S. Pat. No. 4,763,985 to Bingham discloses a launderable retroreflective appliqué that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides. This reflective appliqué is not a marine craft rope.

U.S. Pat. No. 4,815,818 to Thomas discloses three-dimensional flexible reflectors. The reflector is provided with an elastomeric resilient member having a plurality of embedded retro-reflective glass beads. A portion of the outer surface of the elastomeric material is removed to expose the glass beads. The exterior surface of the glass beads at the outer surface is exposed and is not a marine craft rope.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elestomeric material underlying the back surface of the microspheres. A cover layer of transparent elastomeric material covers the front surface of the microspheres. A specularly reflective layer is disposed on the back surface of the spacing layer. The cover layer comprises clear thermoplastic elastomeric aliphatic polyurethane. This retroreflective sheeting does not suggest a marine craft rope.

U.S. Pat. No. 4,957,335 to Kuney discloses microsphere-based retroreflective articles having high retroreflective brightness at narrow divergence or observation angles, i.e. up to 0.5 degrees. The article is made by selection of microspheres having defined combinations of average diameter and average refractive index. This patent teaches (column 4, lines 18-23) that variation in the size of the microspheres will increase the observation angle or divergence angle of the resultant retro-reflective article. The reflective spheres reflect only in a narrow range and the flat coating does not provide omnidirectional reflection.

U.S. Pat. No. 5,066,098 to Kult, et al. discloses a cellular, encapsulated-lens, high whiteness retroreflective sheeting having a flexible cover sheet. This cellular, encapsulated-lens retroreflective sheeting comprises a base sheet of a monolayer of retroreflective elements that is partially embedded in a binder layer, which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for ropes, which require structures that can twist and flex. U.S. Pat. No. 5,117,304 to Huang, et al. discloses a retroreflective article. The retroreflective article has corner cubes and is flexible. It can be applied over irregular surfaces by using an optically clear, aliphatic polyurethane polymer. The aliphatic polymer is composed of a plurality of hard chain segments having the formula —C(O)N(H)—C$_6$H$_{10}$—N(H)C(O)—. The hard chains of cured polyurethane provide a hard, inflexible coating which cannot be applied over a flexible rope.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols. This reflective appliqué does not disclose or suggest the construction of a marine craft rope.

U.S. Pat. No. 5,283,101 to Li discloses a launderable retroreflective appliqué comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer. This reflective appliqué provides no disclosure concerning a marine craft rope.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity. This is a reflective coating with two layers having a different refractive index. There is no disclosure that this coating is applied to a rope; moreover the presence of two polymeric coatings may debond and degrade when bent or twisted.

U.S. Pat. No. 5,882,796 to Wilson, et al. discloses bonded structured retroreflective sheeting. The structured retroreflective sheeting includes an array of corner cube, structured retroreflective elements, a thermoplastic sealing film located proximate to the structured elements, and a bonding agent between the sealing film and the structured retroreflective elements. The bonding agent bonds the sealing film to the structured retroreflective film. This bonded structure is rigid and is unlikely to survive the flexing and twisting movements of a marine craft rope.

U.S. Pat. No. 5,926,314 to Smith, et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing reflective ropes.

U.S. Pat. No. 5,962,108 to Nestegard, et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly (methylmethacrylate); polycarbonates; cellulosics; polyesters such as poly(butyleneterephthalate); poly (ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material that includes: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a marine craft rope.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use as a marine craft rope.

U.S. Pat. No. 6,159,537 to Crandall discloses a method of making a retroreflective article that has a binder layer containing an epoxy resin and silicone crosslinked polymer. A pre-binder composition comprises about 5 to about 40 parts of an epoxy resin. About 60 to about 95 parts of an alkoxysilane terminated polymer is applied to a retroreflective layer and then cured to form a binder layer that is adhered to the retroreflective layer and an article of clothing. The binder composition does not cover the exterior surface of the reflective layer, and does not provide abrasion resistance needed for a marine craft rope.

U.S. Pat. No. 6,677,028 to Lasch, et al. discloses retroreflective articles having multilayer films and methods of manufacturing same. These retroreflective articles have multilayer films and are useful for commercial graphics and retroreflective products, such as roll-up signs for highway transportation safety. The articles comprise multilayer films having at least one layer of polyurethane and a core layer of a copolymer of alkylene and a bond layer of non-acidic, polar co-monomer including, ethylene copolymer, vinyl acetate, acrylate, EVA, acid-modified EVA, anhydride-modified EVA, acid-acrylate-modified EVA, anhydride-acrylate-modified EVA, EEA, EMA, AEA, EVACO, EBACO, and EnBA. The glass retroreflective beads comprise an air-exposed portion or have an overlay polyurethane or EAA cover film. When retroreflective glass beads are exposed to air, they are subject to wear; and therefore the multilayer retroreflective films articles may not be used on a marine craft rope.

U.S. published patent applications 20050157389 and 20050157390 to Shipman et al. discloses retroreflective elements and articles. The retroreflective elements and retroreflective articles are used as pavement markings and comprise retroreflective elements forming laminates. The retroreflective elements are not incorporated in a rope suited for marine craft use.

U.S. Pat. No. 4,167,156 to Kupperman, et al. discloses a reflective animal leather leash. The elongated leather animal leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers. Therefore, this flat strip reflective configuration is unsuited for marine craft ropes.

U.S. Pat. Nos. 5,243,457 and 5,237,448 to Spencer disclose a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface and reflects light from the prism-like formations through the smooth light transmissive surface. In one embodiment, the visibility enhancing material includes a flexible elongate member. In another embodiment, the second layer is replaced with a layer of luminescent material, which can be selectively energized to become luminous. This embodiment requires wires and illumination sources that can be easily integrated into a pet leash that can be twisted and flexed. Since the transparent reflective material is a molded plastic of prismatic construction it is rigid and is not flexible and does not form a leash that is capable of being twisted and bent, key functional requirements for a marine craft rope. Further any twisting and bending action separates the reflective element from the luminescent element.

U.S. Pat. No. 6,355,349 Chizmas discloses reflectively enhanced coated cable. This coated cable includes a structural core made of twined wire or other suitable material, and an outer thermoplastic layer surrounding the structural core, such outer core being transparent to light and a reflective layer that reflects the incident light imposed between the structural core and the outer layer. In a second embodiment, a reflective layer interposed between the structural core and the outer layer, the reflective layer being provided in the form of a wrapped tape disposed below the outer layer. The wrapped tape of reflective material is not braided and therefore cannot take the bending and twisting action of a marine craft rope.

U.S. Pat. No. 6,925,965 to Hurwitz discloses flexible omni-directionally reflective pet leash having handle, central pet leash, and pet collar sections that reflect an incoming light beam back in the same direction as it was emanated. The reflected light beam provides accurate illumination of the pet owner's hand, pet leash and the location of the pet during dusk or nighttime hours. This flexible omnidirectionally reflective pet leash is created by surrounding a central braided rope of nylon or polyethylene fibers with a cylindrically braided reflective sleeve composed of narrow width reflective strips that comprise narrow woven, braided or knitted nylon or polypropylene strips thermally bonded to a flexible polymeric sheet with attached retroreflectors of the corner cube or microsphere configuration. This omnidirectionally reflective pet leash reflects light over a larger angle of acceptance, illuminating pet owner's hand, the leash, and the pet's collar, thereby providing an improved measure of safety for both the pet and the pet handler. This omnidirectional pet leash does not suggest a rope suitable for marine craft applications; and it does not contain a floatation core.

U.S. published patent applications 20060026933 and 20060026934 to Hurwitz disclose an omnidirectionally reflective horse halter. This flexible omnidirectionally reflective horse lead has a central portion, and mechanical attachment means to accommodate a bridal bit ring. The lead reflects an incoming light beam from a walker or horseback rider back in the direction from which it emanated, preventing dangerous encounters during dusk or nighttime hours. The omnidirectionally reflective elements may be incorporated in a horse harness, or in a halter suitable for horses roaming in a paddock or field. The reflective elements are created by surrounding a central braided rope of nylon or polyethylene fibers with a cylindrically braided reflective sleeve. The braided reflective sleeve is composed of narrow width reflective strips having a show surface with a flexible nylon retroreflective sheet sewn thereto. Reflectivity is achieved by thermally bonding corner cube or microsphere retroreflectors to a flexible polymeric sheet. Due to its braided construction, the reflective elements reflect light omnidirectionally over a large angle of acceptance, illuminating the horse harness or halter. An improved measure of safety is thereby provided for both the horse and the horseback rider. This omnidirectionally reflective horse halter is not a rope suitable for marine craft applications; and it does not contain a floatation core.

U.S. published patent application 20060027188 to Hurwitz discloses an abrasion resistant omnidirectionally reflective pet leash. This flexible abrasion resistant omnidirectionally reflective pet leash has handle, central pet leash, and pet collar sections that reflect an incoming light beam back in the same direction as it was emanated. The reflected light beam provides accurate illumination of the pet owner's hand, pet leash and the location of the pet during dusk or nighttime hours. This pet leash is created by surrounding a central braided rope of nylon or polyethylene fibers with a cylindrically braided reflective sleeve that is coated with an abrasion resistant transparent polymeric coating. The braided reflective sleeve is composed of narrow width reflective strips that comprise a woven or knitted narrow width strip and a flexible nylon retroreflective sheet sewn thereon. The flexible retroreflective sheet is formed by thermally bonding corner cube, microsphere retroreflectors, or wide-angle exposed retroreflective lenses to a flexible polymeric sheet. Due to its braided construction, the reflective pet leash reflects light omnidirectionally over a large angle of acceptance, illuminating the pet owner's hand, the leash itself, and the pet's collar, thereby providing an improved measure of safety for both the pet and the pet handler. This abrasion resistant omnidirectional pet leash does not suggest a rope suitable for marine craft applications; it does not contain a floatation core.

Notwithstanding the efforts of prior art workers to construct a marine craft rope, that there clearly exist a need in the art for a flexible, bendable rope that floats when thrown on water. Also needed in the art a rope that is omnidirectionally reflective, so that any light from a vessel is directly reflected back to the source regardless of its approaching direction, thereby providing enhanced visibility of the rope location with respect to a swimmer. Further needed are omnidirectional reflective rope markers for random floating objects such as buoys, fishing line markers, lobster pot markers and the like. The back reflection properties can be adversely affected by the retention of water on the surface of the reflective elements. Consequently, it would be advantageous for the omnidirectionally reflective rope to shed the water on areas thereof that are above the waterline as quickly as possible.

SUMMARY OF THE INVENTION

The present invention provides a low density abrasion resistant omnidirectionally reflecting rope that floats on water and readily sheds the water from the omnidirectionally reflective surface as quickly as possible, preserving the omnidirectionally reflective properties. The rope is provided with a low density core that has a density less than one so that the rope will readily float on water. The core is flexible enough for easily forming a loop or wraps around a buoy. The core material has to be operable in seawater and fresh water environments and should not soak water, since soaking will increase the density of the rope core, causing the rope to submerge.

Recently low-density flexible polymeric foams that are immune to soaking have been available. Closes cell sponges are typically made from EPDM (ethylene propylene diene M-class rubber), neoprene (also known as polychloroprene), styrene butadiene rubber, nitrile butadiene rubber, EVA (Ethylene-vinyl acetate), polyvinyl chloride and PVC/NBR (nitrile butadiene rubber) blend. For example PLI (Pak-Lite) industries located at PLI—Atlanta (Corporate) 550 Old Peachtree Rd, Suwanee, Ga. 30024, web address, http://www.pliusa.com/automaterials.htm, provides many shapes of closed cell foams with selected densities made from EPDM, Neoprene, SBR, NBR, EVA, PVC, PVC/NBR with densities from 2.5 pounds per cubic feet to 22 pounds per cubic feet with custom thickness available. Once the cells are closed, no water soaks through the flexible polymer foams. These polymer based materials are stable in fresh water and sea water. Fresh water has a density of 62.416 pounds per cubic foot at 32° F. and salt water is heavier. As a result, the foam core floats on fresh water and salt water.

The foam core of the rope is highly corrosion resistant and is not omnidirectionally reflective and therefore does not reflect light back to the light originating source and therefore do not stand out in a dark or foggy marine environment and therefore their presence cannot be discerned from a distance. The present invention uses this foam core that is covered with braided tapes of retroreflective sheets forming a cylindrical sleeve that is attached in places to the foam core to allow flexing of the retroreflective tapes when the rope is twisted or flexed. The braided tapes of retroreflective sheets may be covered with an abrasion resistant coating as well as water shedding repellant transparent coating to prevent damage to the retroreflecting elements properties of the braided sheets. Due to the cylindrical sleeve construction of the retroreflective tapes, retroreflecting elements are available in the entire 360 degree orientation surrounding a rope, so that light incident from any direction is directly reflected back to the source providing a bright reflection that is observable from a distance that is further away than that possible by light illumination. Since the back reflected light is collimated with a divergence similar to that of the incident light, the brightness delivered to the source is also similar in divergence and intensity comparable to viewing the source from about twice the distance representing the sum of forward path and the reflected path. This intensity is significantly larger than that of diffused scattered light from a common object.

The braided tapes forming the sleeve of the omnidirectionally reflecting rope contain retroreflective elements, which may be retroreflective corner cube reflectors or microspheres or retroreflective lenses. These retroreflective elements are thermally bonded to a nylon mesh strip to form a flexible nylon retroreflective sheet, which is in turn sewn onto a narrow width reflective strip. With this structure, the rope reflects a significant quantum of the incident light from a light source or other light emitting element back to the source. The abrasion resistance property and the water repellant property of the rope is provided by a transparent coating. The polymeric coating is flexible and has a refractive index significantly smaller than that of the retroreflective elements used. Abrasion resistance, water repellency and omnidirectional reflectivity is achieved by: a) creating a flexible retroreflective sheet comprising a plurality of corner cube reflectors bonded via a transparent bond to a flexible polymeric sheet, or several microspheres bonded via a transparent bond to a reflectorized flexible polymeric sheet; b) producing a narrow width strip composed of nylon or polypropylene fibers by knitting, weaving or braiding, to achieve a strip width in the range of 0.0065 inch to 0.25 inch, depending upon the size of the central cylindrical rope foam core; c) thermally bonding a flexible retroreflective sheet onto a nylon mesh strip to form a flexible nylon retroreflective sheet which is in turn sewn onto a show surface of the narrow width strip, thereby forming a narrow width reflective strip; d) cylindrically braiding, at a shallow braid angle, three or more narrow width reflective strips to surround and cover the external surface of a cylindrical foam core of the rope made from EPDM, Neoprene, SBR, NBR, EVA, PVC, PVC/NBR; e) forming a cylindrical retroreflective braided sleeve integrally surrounding a central cylindrical foam rope core to thereby create a marine craft rope having an external retroreflector surface that has low density and floats on water; and f) coating or surrounding the external surface of the cylindrical retroreflective braided sleeve with a transparent, flexible abrasion resistant water shedding coating or a transparent polymeric sleeve having a refractive index significantly less than that of the retroreflective elements. The thickness of the transparent abrasion resistant water shedding coating is typically in the range of 0.002 to 0.010 inches.

The cylindrical character of the flexible cylindrical braided sleeve reflects a significant quantum of incident light back to the source effectively since some portion of the braided sleeve is always at angles close to normality and most of the braided cylindrical sleeve falls within the reflecting angular range of the retroreflectors. The shallow braiding angle of the cylindrical braid sleeve lays the thermally bonded narrow width strips at a shallow angle with respect to the length of the cylindrical central core. As a result the marine craft rope can be readily flexed or twisted due to the relative movement provided within the cylindrical braid sleeve structure. The flexibility of the transparent abrasion resistant water shedding coating provides for flexing and twisting movement of the abrasion resistant water shedding marine craft rope without coating separation or delamination.

The external surface of the cylindrical retroreflective braided sleeve is coated with transparent, flexible abrasion resistant water shedding polymeric coating. The coating applied has a refractive index significantly lesser than that of retroreflective elements. Typically the retroreflective elements have a refractive index of 1.9 to 2.2 and the flexible transparent abrasion resistant water shedding polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

The marine craft rope comprises a cylindrical reflective braided sleeve having three or more narrow width reflective strips that are braided at a shallow cylindrical braid angle, said cylindrical reflective braided sleeve being operable to surround the central cylindrical braided high strength braided rope core thereby providing omnidirectional reflectivity. Each narrow width reflective strip has a flexible nylon retroreflective sheet sewn to their show surface. The flexible nylon retroreflective sheet is formed by thermally bonding a retroreflector coated flexible polymer sheet to a nylon mesh strip.

The omnidirectionally reflective rope is highly flexible due to the braided construction of the braided foam core and cylindrically braided reflective sleeve. The rope can be knotted to form a rope loop that can be tossed to a swimmer from a boat or wrapped around a marine buoy that bobs up and down in the water. Due to the water shedding properties of the coating, the exposed surface of the rope above the water line is omnidirectionally reflective.

The omnidirectionally reflective rope may be used in several applications providing omnidirectional reflection thereby delineating the details of a buoy from a great distance even under dusk, fog or dark environment. When the rope is thrown on water, it immediately floats extending above the surface of the water and water surface layer is shedded immediately. These portions of the rope surface that extend beyond the water line omnidirectionally reflect the light along the direction along which the light originally came in. Thus, the floating rope can be visible over the surface of water for a long distance. A swimmer may be seen from a distance and the proximity of the swimmer to the rescue rope can be accurately judged. When the swimmer is secured to the floating rope, the rescue operation, including use of a tow line attached to the floating rope, may be used effectively without the risk of increasing the separation distance between the swimmer and the rescue rope, a possibility when towing operation is undertaken too early.

Each of these applications discussed above would benefit from use of an omnidirectionally reflective rope having improved visibility. The omnidirectionally reflective rope is more easily seen when illuminated by a light source. It is more readily located and more easily avoided by other ships navigating in dimly lit conditions. The improved safety resulting from higher visibility of lifelines and life preservers is readily apparent.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

The present invention provides an omnidirectionally reflective rope that is flexible, twistable and omnidirectionally reflective. It has a central foam core having low density capable of floating on water surface typically encountered in a marine craft application. The foam core is made from closed cell corrosion resistant polymeric material such as EPDM, Neoprene, SBR, NBR, EVA, PVC or PVC/NBR.

The omnidirectionally reflective rope reflects incident light back to its source, thereby clearly defining a rope floating on water surface or a buoy that bobs up and down that has been wrapped with the rope of the present invention. This increases the margin of safety in dusk, fog or night time environments when vessel light illuminates the omnidirectional reflective rope thereby reducing the possibility of accidents. Since the omnidirectionally reflecting rope reflects light over a broad range, due to its reflective cylindrical sleeve arrangement, the light can be at a significant angle and could still be reflected back.

The abrasion resistant water shedding omnidirectionally reflective rope is constructed by building a cylindrically reflective sleeve from narrow width strips of nylon or polypropylene. Reflectivity is achieved by first selecting a flexible polymer sheet and coating the flexible polymer sheet with a plurality of retroreflectors using a transparent binder to form a retroreflector coated flexible polymer sheet. The retroreflector coated flexible polymer sheet is then thermally bonded to a nylon mesh strip to form a flexible nylon retroreflective sheet. The flexible nylon retroreflective sheet is then sewn onto a show surface of a narrow width reflective strip. At least three of these narrow width reflective strips are braided at a shallow cylindrical braid angle to form an omnidirectionally reflective sleeve having a braided construction.

The retroreflecting elements may be corner cubes, in which case the polymeric flexible sheet can be non-reflective. Alternatively, the retroreflecting elements may be microspheres. If microspheres are used as retroreflective elements, the polymeric flexible sheet needs to be reflective and is typically metallized with aluminum or silver. Alternatively, the reflecting elements may be retroreflective lenses that may be embedded in a transparent polyurethane adhesive and used as a reflective strip or bonded to durable cloth. In either case, the retroreflective elements are bonded to the flexible sheet using a transparent binder.

The flexible sheet with retroreflective elements is available from 3M Corporation. The trade name for this product is SCOTCHLITE and the flexible polymer is typically PVC. The product is available in a variety of sizes. The flexible reflectorized sheets may be delivered onto another material by way of utilizing transfer films. These transfer films are composed of retroreflector elements bonded to a variety of heat-activated adhesives. The retroreflector elements include wide angle, exposed retroreflective lenses bonded to a heat activated polyurethane adhesive. The reflective surface is protected by a white paper liner for ease in handling prior to lamination. A plastic liner protects the adhesive side and must be removed before lamination onto the nylon mesh strip. This flexible reflectorized sheet is thermally bonded to a nylon mesh strip, woven or knitted to form a flexible nylon retroreflective sheet.

The nylon mesh strip may have a width of 0.0165 cm to 0.635 cm (0.0065 inches to 0.25 inches) and is thermally bonded to a SCOTCHLITE strip having a width slightly less than the width of the nylon mesh strip. The SCOTCHLITE strip is bonded the entire length of the nylon mesh strip, and is bonded centrally on the nylon mesh strip, so that there are equal side portions of the nylon mesh strip on both sides of the SCOTCHLITE strip. The side portions are then sewn to a narrow width strip. The thermal bonding binder may be selected from a number of polymeric binders including, but not limited to, polyvinyl chloride, polyethylene, polyurethane, polyvinyl acetate or acrylates.

The SCOTCHLITE™ reflective material is composed of wide angle, exposed retroreflective lenses bonded to a heat activated polyurethane adhesive. Alternately, the reflective material is composed of wide angle, exposed retroreflective lenses bonded to durable cloth backing comprised of 65% polyester, and 35% cotton, which is then treated with a polyurethane adhesive and thereby thermally bonded to a nylon mesh strip.

The SCOTCHLITE™ reflective material with the durable cloth backing is then thermally bonded onto a nylon mesh strip to form a flexible nylon retroreflective sheet. The flexible nylon retroreflective sheet is sewn onto a narrow width reflective strip by sewing using a lockstitch with no more than 12 stitches 2.54 cm (per 1 inch), and not less than 2 mm (5/64 inches) from the edge of the reflective fabric. The flexible nylon retroreflective sheet is highly flexible and can be cylindrically braided, for example, through the braiding of the narrow width strip to which it is attached via sewn to the surface thereof. At least three of these narrow width reflective strips are braided at a shallow cylindrical braid angle to form an omnidirectionally reflective sleeve having a braided construction surrounding a central high strength rope core, which substantially sustains the tensile forces encountered.

The abrasion resistant water shedding omnidirectionally reflective rope is constructed by building a cylindrically reflective sleeve from the narrow width strips of nylon or polypropylene having flexible nylon retroreflective sheets sewn thereto. The cylindrical braiding employs three or more narrow width strips. The cylindrical braiding is accomplished with a small angle between narrow width strips and the longitudinal direction of the central high strength rope core.

Reflective material is bonded to a heat activated adhesive to form a transfer film. Alternatively, reflective material may be comprised of glass beads, partially embedded in fabric and coated with a polymer matrix, while still providing exposure of the glass beads to promote optics to form a fabric. The fabric is metalized with silver for abrasion and for industrial use. The reflective material may be impregnated with aluminum, which stands up well to home washing and works well with abrasion protection. The fabric may be laminated with a polyester film (mesh) in back for sewing purposes, and further treated with a heat activated adhesive for thermally bonding to a surface. For example, SCOTCHLITE™ reflective material utilizing silver fabric metalized with aluminum may be utilized. The reflective material by SCOTCHLITE™ sold as transfer film 8710—silver transfer film or, alternatively, 8910 silver fabric, may be utilized. An example of a transfer film and a fabric commercial reflective material by SCOTCHLITE™ is illustrated below:

TABLE A

| Product Name | Daytime Color | Reflected Color | Abrasion |
|---|---|---|---|
| 8710 Silver Transfer Film | Silver | White | EN 530 Method 2/ 5000 cycles |

TABLE A-continued

| Product Name | Daytime Color | Reflected Color | Abrasion |
|---|---|---|---|
| 8910 Silver Fabric | Silver | White | EN 530 Method 2/ 5000 cycles |

* SCOTCHLITE ™ is certified to meet ANSI/ISEA 1-7-1999 Level 2 retroreflective performance and EN 471 Class 2 retroreflective performance.

A transparent abrasion resistant water shedding coating is applied to the outer surface of the cylindrically reflective braided sleeve of the omnidirectionally reflective rope and is applied as a substantially conformal coating. The reflective strips have retroreflective elements embedded in the strips having a corner cube prismatic or microsphere geometry. These transparent retroreflective elements are made from high refractive index transparent materials such as barium oxide-titanium oxide containing glasses. They exhibit a refractive index in the range of 1.9 to 2.2. The transparent abrasion resistant water shedding polymeric coating is selected to have a refractive index, which is significantly less than that of the retrorefractive elements. As a result, the incident and reflected light path is not significantly altered even when the incident beam is inclined to the reflective strips. The internal reflection process within the retroreflective elements is not deteriorated by the transparent abrasion resistant water shedding coating. The polymers suitable for use with the transparent abrasion resistant coating have a refractive index in the range of 1.3 to 1.55.

In addition to this refractive index requirement, the transparent abrasion resistant water shedding coating must exhibit excellent mechanical and flexural properties, including tensile strength and elongation, in order to provide the required abrasion resistance. The polymer coating must also exhibit superior bond properties to the retroreflective elements and the underlying polymeric sheet of the reflective strip. If the bond properties are poor, the transparent abrasion resistant water shedding coating may delaminate when the rope is subjected to abrasion or flexing and twisting movement. The transparent abrasion resistant water shedding coating must have low elastic modulus so that it remains flexible when the rope is twisted. A high modulus transparent abrasion resistant water shedding coating is not desired since it applies significant stresses at the coating-reflective tape interface resulting in deterioration or fracture of the retroreflective elements.

A number of polymer systems meet these requirements. These polymers may be applied by dipping the cylindrically braided omnidirectionally reflective rope in a polymeric melt or by spraying a polymer composition dissolved in a suitable solvent. Thermosetting resin compositions such as two-component polyurethane may be painted or sprayed over the cylindrically braided reflective outer surface of the omnidirectionally reflective rope. Silicone coating can have abrasion resistance, water shedding properties as well as proper refractive index. For example, the article at web page www.polytec-pt.com/ . . . /21_Index_Matching_Silicone_for_High_Brightness_LED_Packaging(1).pdf discloses a silicone with a refractive index of 1.4, typically used for encapsulating high brightness light emitting diodes. In Table B below there are listed a number of transparent polymer compositions suitable for the rope abrasion resistant coating. Also listed are the refractive indexes for the compositions.

TABLE B

| Polymer Name | Refractive Index |
|---|---|
| aliphatic thermoplastic polyurethanes | 1.35 to 1.45 |
| Dow Corning OE-4100 Silicone elastomer | 1.4751 |
| Polymethyl tetradecyl siloxane | 1.4550 |
| Poly vinyl acetate | 1.4665 |
| PMMA Poly methyl methacrylate | 1.4893 |
| Cellulose acetate | 1.4750 |
| Ethylene/vinyl acetate copolymer EVA | 1.4820 |

Thermoplastic aliphatic thermoplastic polyurethanes are preferred as compared to aromatic urethanes because of their transparency, resistance to dirt build-up, flexibility ultraviolet radiation degradation resistance. Typically, aliphatic polyurethane has the structure

[—O—(CH(CH$_3$)CH2O$_{20}$—C(O)—NH—R—NH—C(O)—]; or
[—O—(CH$_2$—CH$_2$CH$_2$CH$_2$—O—)$_{10}$—C(O)—NH—R—NH—C(O)—], where R is a non-aromatic group.

Rohm and Haas, (Morton International Inc) supplies melt extrudable polyurethane compositions under the trade name designation MORTHANE L430.77 and MORTHANE Brand PN 3429-215. A melt extrusion process may be used to coat the external surface of the cylindrically braided reflective sleeve Aptec Laboratories, 28570, Livingston Avenue, Valencia Calif. 91355-4171. 661-257-1677 markets polyurethane with low elastic modulus for conformal coatings. Two component APTEK transparent unfilled polyurethane compositions of interest include the composition 2503-A/B (www.apteklabs.com/products/2503-AB.pdf) and the composition 2506-A/B (www.apteklabs.com/products/2506.pdf). These two compositions are designed for the encapsulation and protection of devices in applications that require toughness, excellent flexibility and optimum tensile strength, as well as elongation characteristics. APTEK 2503-A/B is curable at 80 C while APTEK 2506-A/B is room temperature curable. Both compositions are dissolved in a solvent and are therefore suitable for brush or spray application.

Bayer provides a number of clear polyurethane coating compositions based on one component or two component systems. Desmodular I aliphatic diisocyanate is often abbreviated to IPDI, CAS 4098-71-9. Polyurethane prepared from IPDI is clear, tough and resists photodegradation and hydrolysis. Isocyanurate based on IPDI is marketed by Bayer under the trade name Z-4470; and is available in a number of solvent blends. Two component polyurethane is commonly formulated with Desmodur Z-4470. Desmodur E polyisocyanates is a single component moisture curable system capable of being diluted in a solvent. www.setcochemicals.net/resins4.htm discloses a flexible room temperature curing polyurethane coating designated ROTOTHANE® 9020. This coating adheres to plastics and leather.

Dow Corning supplies a number of silicone compositions suitable for coating the cylindrically braided reflective strips to provide abrasion resistance and water shedding properties. Conformal coatings are materials applied in thin layers (typically a few mils or a fraction of a mm) onto printed circuits or other electronic substrates. They provide environmental and mechanical protection to significantly extend the life of the components and circuitry. Conformal coatings are traditionally applied by dipping, spraying or simple flow coating, and increasingly by select coating or robotic dispensing. Key requirements for the clear coating are low viscosity, enabling application of thin conformal coatings, room temperature cure in reasonable cure time and reasonable hardness. In Table C below there are shown some of the conformal silicone coatings marketed by Dow Corning.

TABLE C

| Product Name | One part/Two part | Viscosity CPS | Cure | Durometer |
|---|---|---|---|---|
| 3-1965 | 1 | 110 | RT 24 Hrs Moisture cure | 29 A |
| 3-1953 | 1 | 360 | RT 24 Hrs Moisture Cure | 26 A |
| 3-1765 | 1 | 150 | RT 24 Hrs Moisture cure | 25 A |
| 3-1753 | 1 | 385 | RT 24 Hrs Moisture cure | 25 A |
| Sylgard 1-4128 | 2 | 450 | 20 min/85 C. | 64 OO |
| I-4105 | 1 | 470 | 10 min/105 C. | 65 OO |
| QI-4010 | 1 | 830 | 15 min/110 C. | 30 A |
| I-2620 | 1 | 250 | RT 72 Hrs | 25 D Abrasion Resistant |
| I-2577 LOW VOC | 1 | 1250 | RT 72 Hrs | 25 D Abrasion Resistant |
| I-2577 | 1 | 725 | RT 72 Hrs | 23 D Abrasion Resistant |

Candidates for silicone conformal coating compositions that meet the low viscosity in the range of 100-250 CPS, room temperature cure in reasonable time period and reasonable hardness are coating compositions 3-1965, 3-1765 and I-2620. These compositions may be dipped, brush painted or sprayed.

Of particular interest is a Dow Corning OE-4100 optical silicone elastomer, which cures in 2 hour at 150 C with a platinum based catalyst, as discussed in www.dowcorning.com/content/photonic/75-1009B-01.pdf. This composition is specifically developed for use in the optical coating of optical components and is clear, transparent with a refractive index of 1.47.

Polyvinyl acetate is soluble in acetone as well as toluene. Acetone dissolved polyvinyl acetate film has a slightly higher elastic modulus as compared to that dissolved in toluene due to rapid evaporation of acetone. Acetone dissolved polyvinyl acetate is applied to the cylindrically braided surface of the rope to form a flexible film which is resistant to twisting action of a rope. Polyvinyl acetate is available from Union Carbide under the trade names AYAC, AYAA, AYAF and AYAT depending upon the molecular weight of the polymer.

Figure 1A:
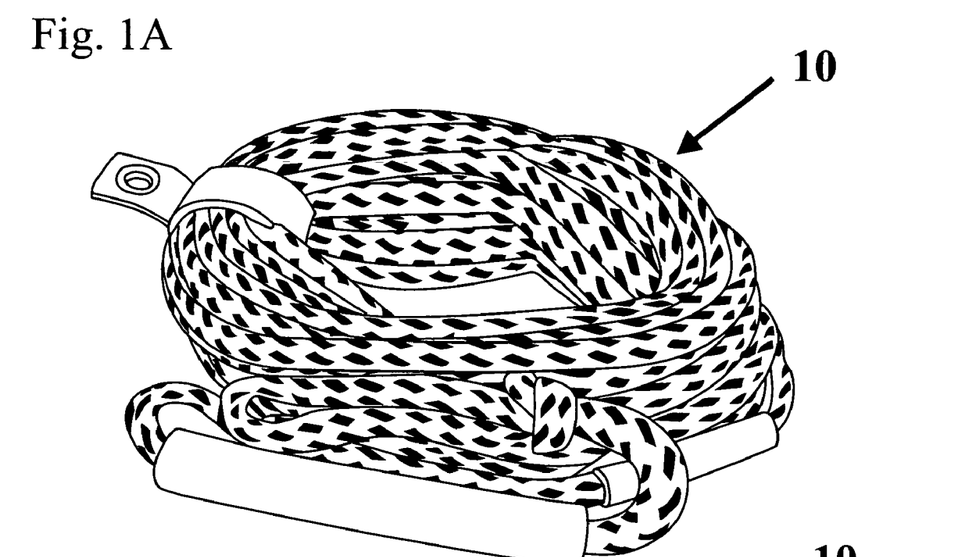
FIG. 1A is a photograph showing wound omnidirectionally reflective rope with a low-density foam core and the reflective cylindrical braided sleeve of narrow width strips covering a central foam core which may be thrown in the water towards a swimmer.

FIG. 1A illustrates at 10 a photograph of a wound omnidirectionally reflective rope with a low-density foam core. The reflective cylindrical braided sleeve of narrow width strips covers a central foam core that will float on water for prolonged periods of time and therefore may be thrown in the water towards a distressed exhausted swimmer. The rope is flexible and can be readily wound as shown. The water shedding properties of the rope allows the portion of the rope surface that extends outside the water surface to be omnidirectionally reflective.

Figure 1B:
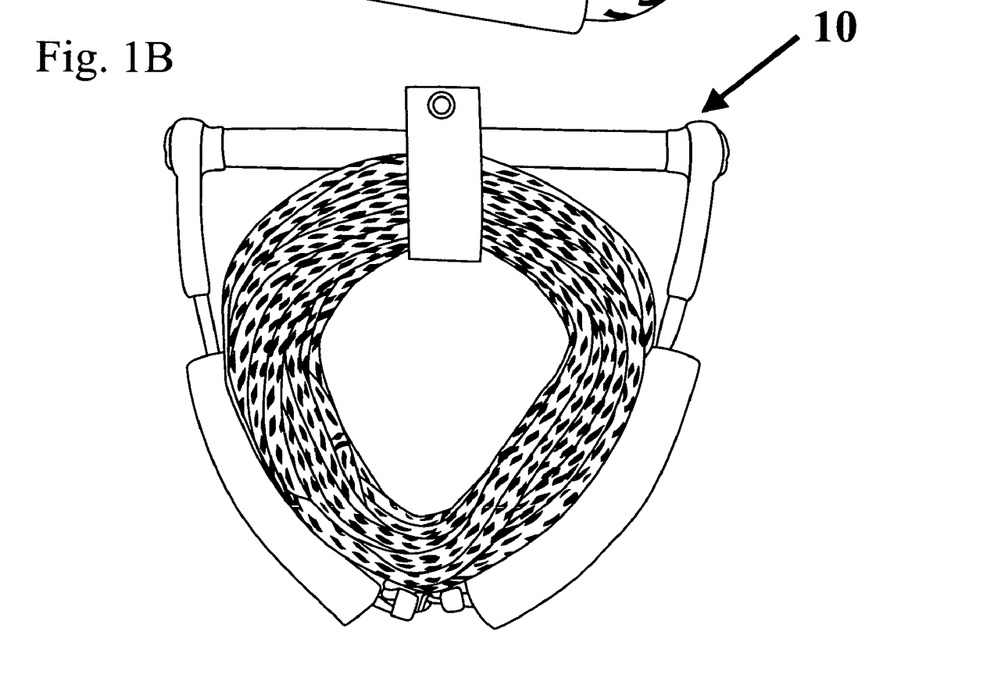
FIG. 1B is a photograph showing another wound omnidirectionally reflective rope with a low density foam core and the reflective cylindrical braided sleeve of narrow width strips covering a central cylindrical foam core which may be thrown in the water towards a swimmer.

FIG. 1B illustrates at 10 another photograph of a wound omnidirectionally reflective rope with a low-density foam core hanging from a hook. The reflective cylindrical braided sleeve of narrow width strips covers a central foam core that will float on water for prolonged periods of time and therefore may be used to wind around a fishing line or lobster trap buoy. Even though the buoy bounces in and out of the water, the portion of the wound buoy marker above the water line omnidirectionally reflects back any incoming light along the beam path.

Figure 2:
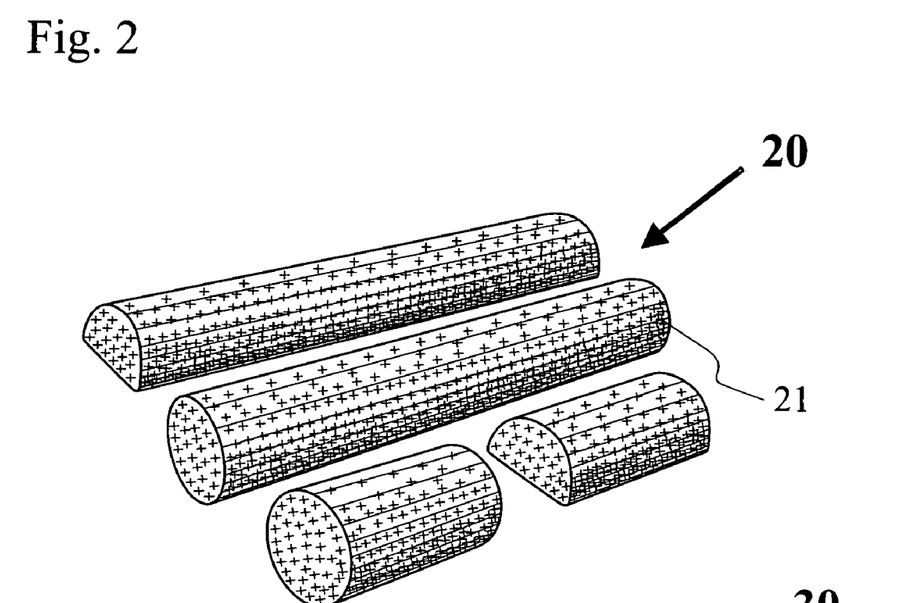
FIG. 2 is a photograph showing flexible closed cell foam that has low density and floats on water.

FIG. 2 illustrates at 20 photograph of several samples of low density closed cell polymeric foam core. Due to the low density, these foam cores float readily in water. The polymeric foam is not corroded or degraded by salt water or fresh water. Since the foam has only closed cells, water does not enter and soak the foam. Therefore, the polymeric foam core can float on the water surface indefinitely.

Figure 3:
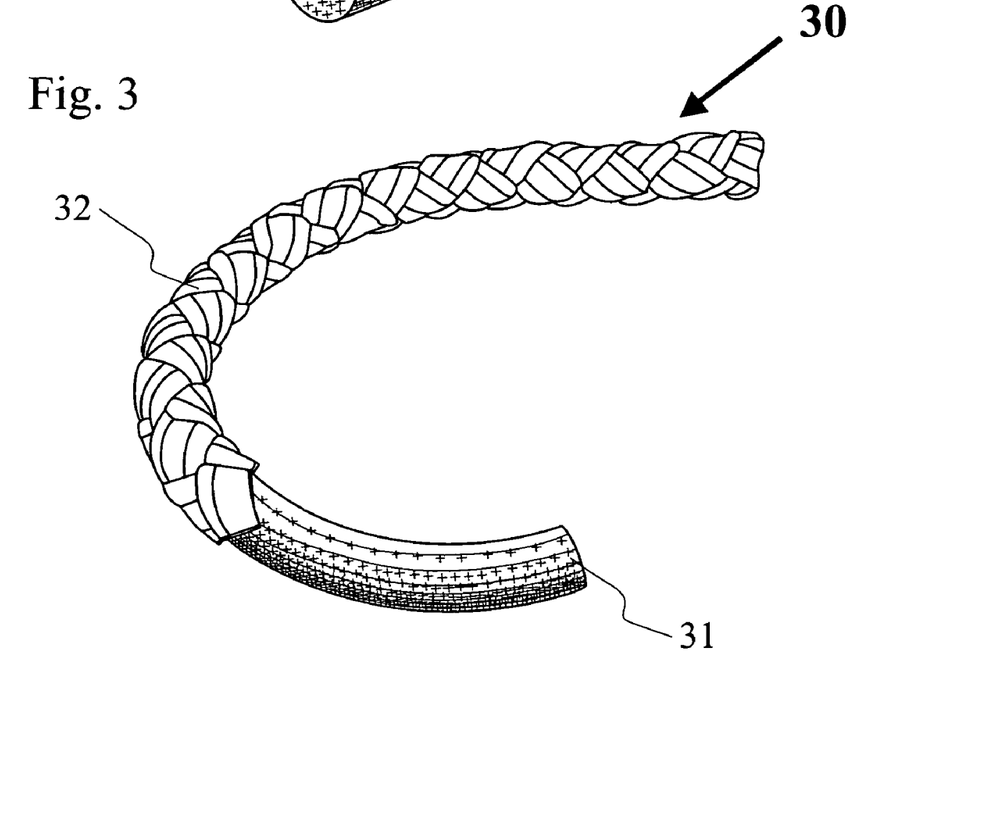
FIG. 3 is a photograph showing flexible closed cell foam that has low density and floats on water and is braided with a omnidirectional reflective tape.

FIG. 3 is illustrates at 30 photograph of a low-density closed cell polymeric foam core 31 that is partially braided at 32 with three omnidirectionally reflective tapes. The omnidirectionally reflective tape 32 covers the entire outer surface of the polymeric foam core 31.

Figure 4A:
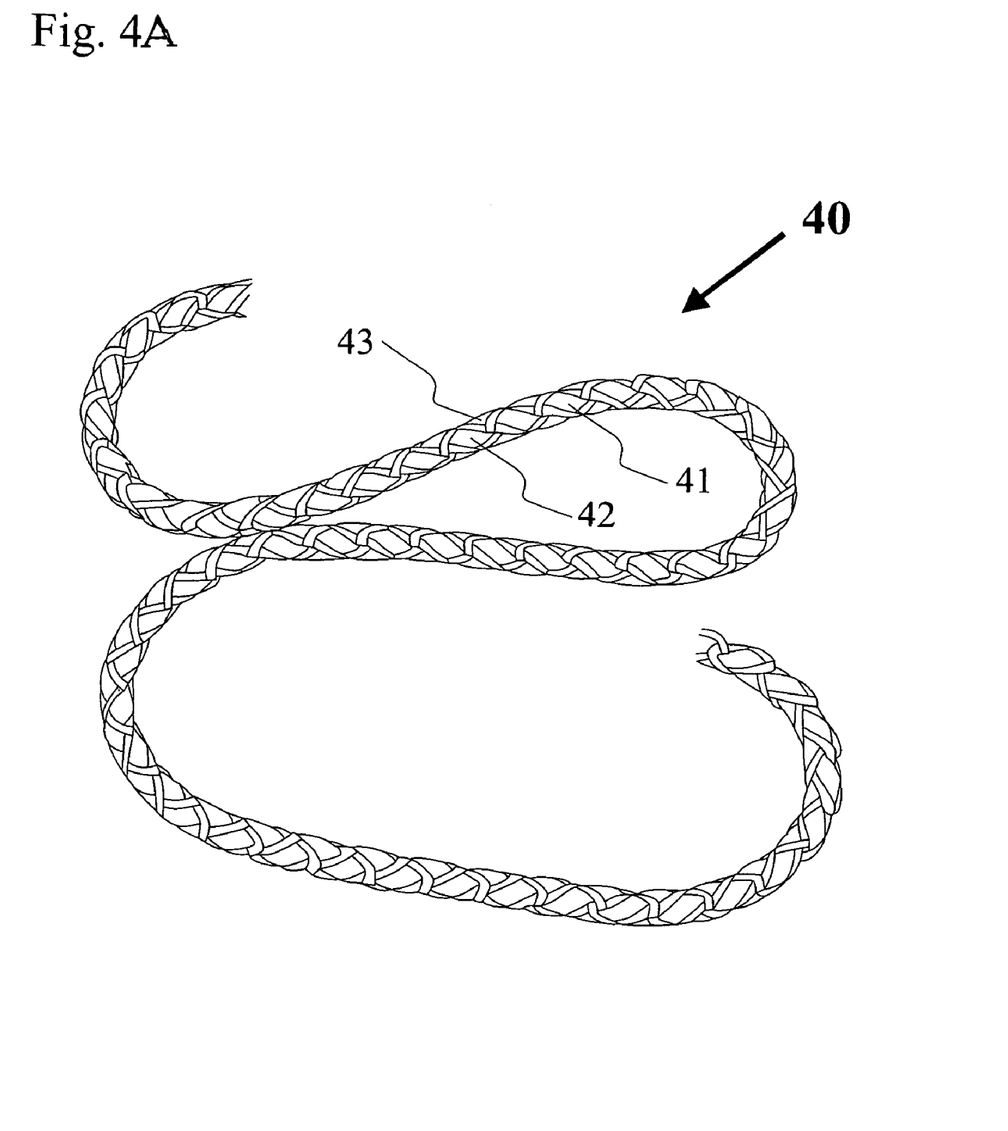
FIG. 4A is a photograph showing omnidirectionally reflective rope with the reflective cylindrical braided sleeve of narrow width strips covering a central foam core, taken with camera flash light showing reflective portions as bright regions.

FIG. 4A is a photograph showing generally at 40 the omnidirectionally reflective rope. A cylindrically braided sleeve, created from braided narrow width reflective strips 41, 42 and 43, substantially covers the entire surface of a foam core, which is therefore invisible in this photograph, providing omnidirectional reflectivity. The omnidirectionally reflective rope completely reflects incident light in the same direction the light was emanated. Due to the cylindrical character of the reflective braided sleeve, some portion of the sleeve is always at normal orientation to the incoming light beam, that is, the direction at which the reflection from the retroreflective elements is maximized. Retroreflective elements reflect light over a large range of acceptance angles, but the reflection is at a lower intensity. This cylindrical construction effectively reflects the incoming camera flash light as shown in the photograph of FIG. 4A by the extremely bright appearance of the retroreflectors incorporated within the narrow width reflective strips.

Figure 4B:
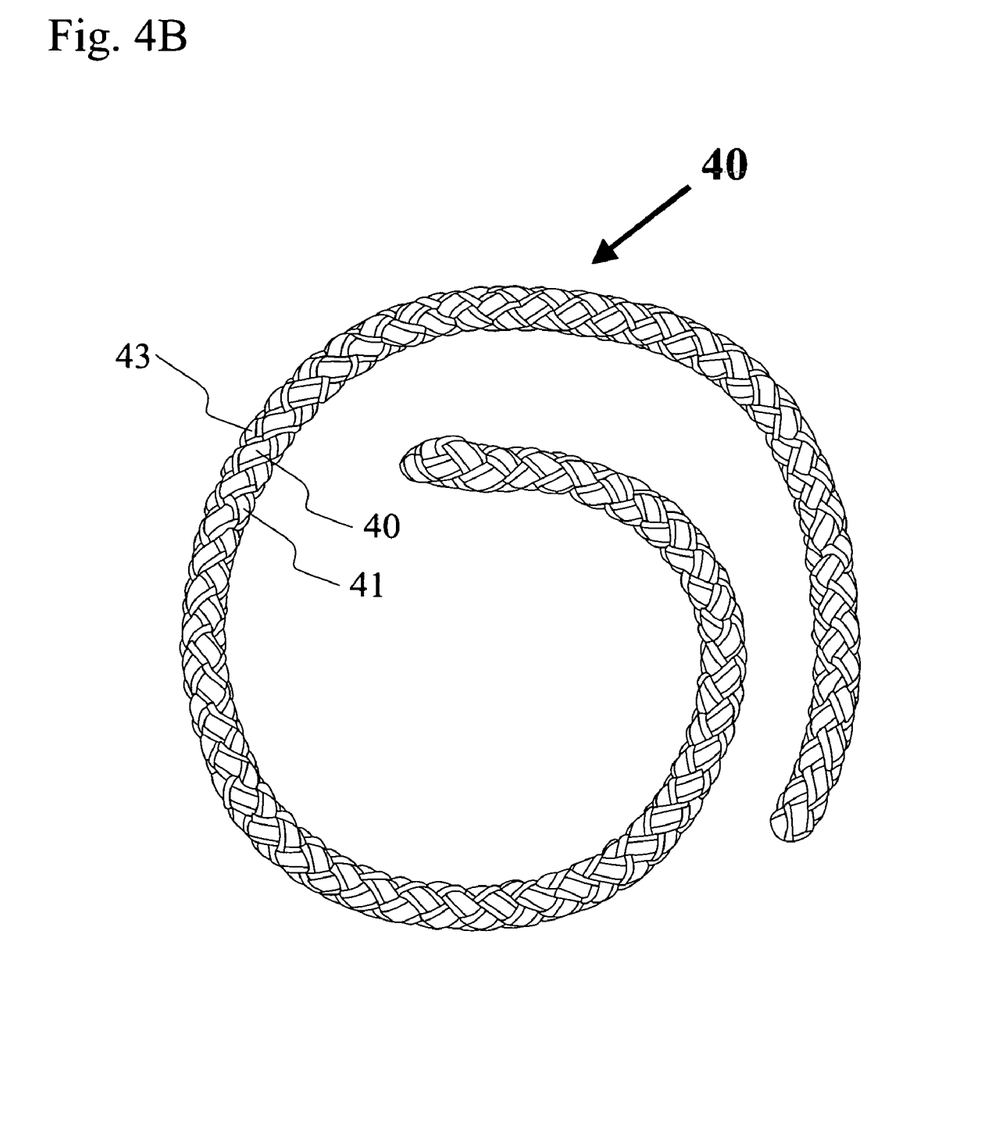
FIG. 4B is a photograph showing omnidirectionally reflective rope with the reflective cylindrical braided sleeve of narrow width strips covering a central foam core, taken without camera flash light showing reflective portions as dark regions.

FIG. 4B shows generally at 40 a photograph of another view of the omnidirectional reflective rope illustrated in FIG. 4A without using a camera flash. The illumination comes from the room's light. The light here again is reflected back to the illuminating source, which is the room light, and practically no light is directed in the direction of the camera. As a result, the retroreflector bright areas of FIGS. 4A, 41, 42 and 43 now appear dark.

Figure 5:
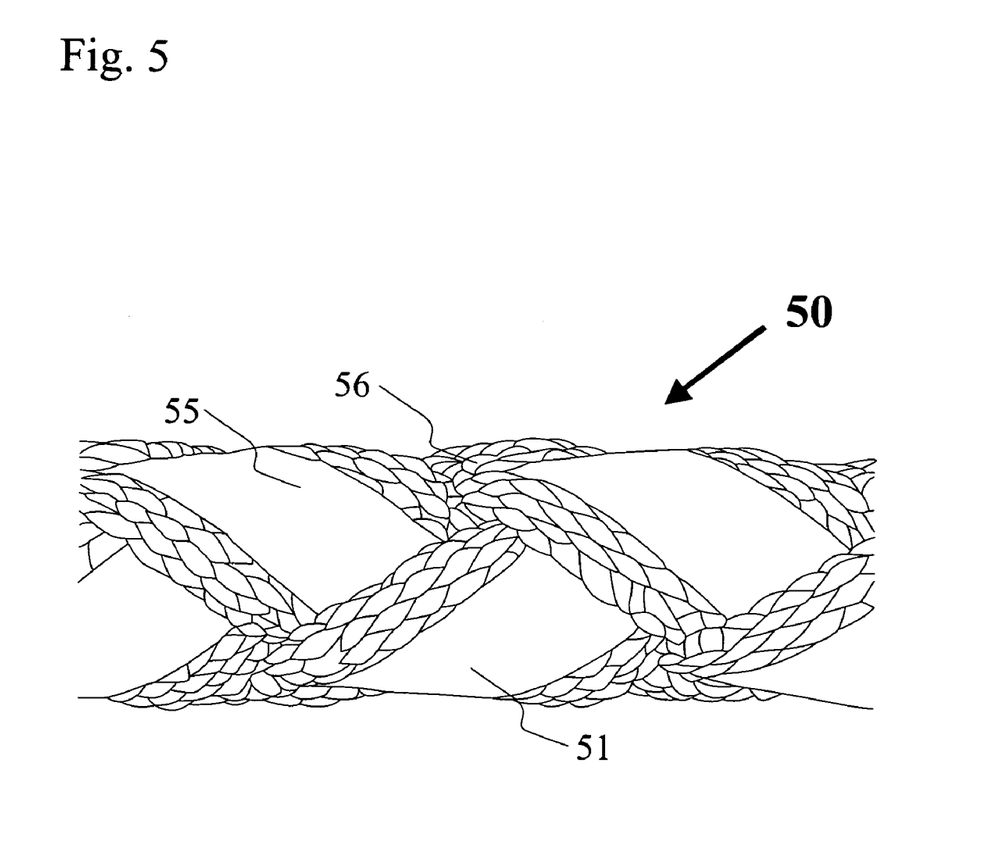
FIG. 5 is a photograph showing omnidirectionally reflective rope illustrating the details of a transparent abrasion resistant water shedding polymeric conformal coating substantially covering the reflective cylindrical braided sleeve of narrow width strips surrounding a central foam core and also schematically illustrating the construction of the narrow width reflective strips that are braided at a shallow cylindrical braid angle to form the omnidirectionally reflective sleeve.

FIG. 5 is a photograph showing generally at 50 a magnified portion of the omnidirectional reflecting rope. The photograph shows at 51 a transparent abrasion resistant water shedding polymeric conformal coating substantially covering the reflective cylindrical braided sleeve of narrow width strips surrounding a central high strength braided core. The cylindrical reflective braided sleeve is braided with a small braid angle of 5 to 10 degrees between the narrow width strips surrounding the central cylindrical rope core of the rope. The central cylindrical high strength braided rope core is completely covered by the cylindrical reflective braided sleeve and therefore is invisible in the photograph. The flexible nylon retroreflective sheet is shown at 56 and the narrow width strip is shown at 55, which is braided to form the cylindrical braided sleeve. The flexible nylon retroreflective sheet 56 is sewn onto a show surface of the narrow width strip 55 prior to cylindrical braiding operation. The outer surface of the flexible nylon retroreflective sheet 56 and the narrow width strip 55 is covered with a transparent conformal flexible abrasion resistant water shedding coating 51, which is applied after cylindrical braiding operation.

Figure 6:
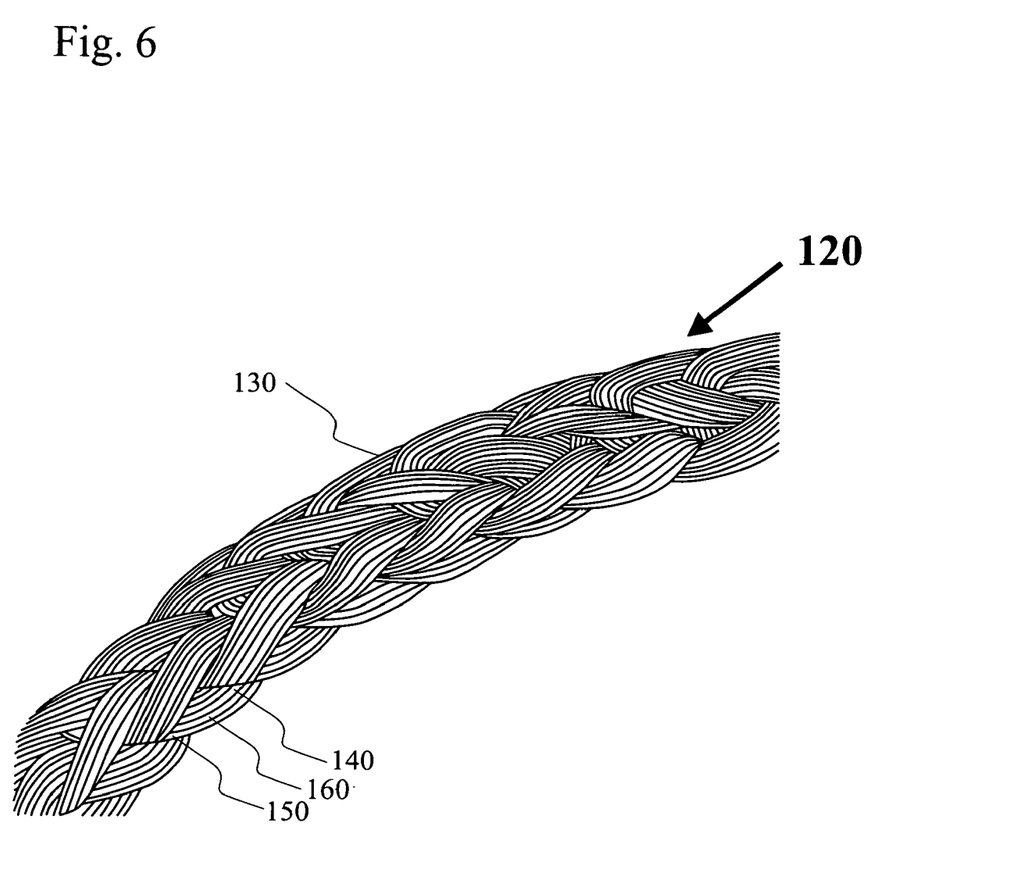
FIG. 6 depicts a portion of the omnidirectional, reflecting rope comprising an alternative embodiment of the invention.

FIG. 6 depicts a portion of the omnidirectional, reflecting rope comprising an alternative embodiment of the invention. A cylindrical reflective braided sleeve 130 is formed by braiding narrow width reflective strips 150, which are formed of a plurality of reflective threads 160 and, optionally, colored threads 140 worked into a weave. The narrow width reflective strips 150 are braided with a small braid angle of 5 to 10 degrees between the narrow width strips 150 surrounding a central cylindrical rope core 170 of the rope. The central cylindrical rope core 170 is completely covered by the cylindrical reflective braided sleeve 130 and therefore is invisible in the photograph. Preferably, a transparent abrasion resistant polymeric conformal coating substantially covers the reflective cylindrical braided sleeve 130 of narrow width strips 150. A plurality of reflective threads 160 is preferably combined with colored threads 140 and worked into a weave to form the narrow width reflective strips 150. The narrow width reflective strips 150 are braided at a shallow cylindrical braid angle to form the omnidirectionally reflective sleeve 130 having a braided construction that surrounds the central rope core 170 and covers each of the proximal, central, and distal end sections of the rope, providing substantially the entire surface of the rope 120 with omnidirectional reflectivity.

The key components of the abrasion resistant omnidirectionally reflective rope include, in combination, the features set forth below:

1. a central cylindrical low-density closed cell foam core composed of EPDM, Neoprene, SBR, NBR, EVA, PVC, PVC/NBR that can float over water for prolonged period of time without soaking;
2. the central cylindrical rope closed cell foam core being covered substantially with a cylindrically reflective braided sleeve and coated with a transparent abrasion resistant water shedding conformal coating;
3. the cylindrically reflective braided sleeve being formed by cylindrically braiding narrow width reflected strips, formed from knitted, woven or braided nylon, or polypropylene narrow width strips, having a flexible nylon retroreflective sheet, comprising a flexible retroreflective sheet thermally bonded onto a nylon mesh strip, sewn to the surface thereof;
4. each of the flexible retroreflector sheets being prepared by bonding corner cube geometry retroreflectors to a flexible polymeric sheet using a transparent binder;
5. such flexible retroreflector sheets alternately being prepared by bonding microsphere geometry retroreflectors to a metallized reflective flexible polymeric sheet using a transparent binder;
6. each of the flexible retroreflective sheets being thermally bonded to a nylon mesh strip to form a flexible nylon retroreflective sheet;
7. twist and flexure forces acting on the abrasion resistant water shedding omnidirectionally reflective rope being accommodated by the braided construction of the cylindrical reflective sleeve and the flexibility of abrasion resistant water shedding coating;
8. the cylindrical braided sleeve-covered rope substantially reflecting incident light back in the same direction as the incident light, clearly indicating the whereabouts of the rope floating on water surface or a buoy that is wound with said omnireflective rope; and
9. the abrasion resistant properties and water shedding properties omnidirectionally reflective rope providing an increased margin of safety preventing marine craft accidents due to enhanced visibility in dusk, fog and dark or dimly-lit environments.

The abrasion resistant water shedding omnidirectionally reflective rope disclosed herein can be modified in numerous ways without departing from the scope of the invention. For example, the rope can be adapted to cordon off newly paved wet roads, such as access roads, driveways and parking areas; or to control access to selected marine areas, such as boat docks, boardwalks, harbor landing stations, lake docking and restricted areas, and recreational areas. These and other modifications and uses are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An omnidirectionally reflective rope, comprising:
a. a central cylindrical low-density polymeric closed cell foam core operable to float over water for a prolonged time;
b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
c. said cylindrical reflective braided sleeve being substantially coated with a conformal transparent polymeric abrasion resistant water shedding coating;
d. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
e. said flexible retroreflective sheet having retroreflectors bonded thereto with a transparent bond layer;
f. said transparent polymeric abrasion resistant water shedding coating having a refractive index lower than that of said retroreflectors; and
g. said transparent polymeric abrasion resistant water shedding coating polymer is a member selected from the group consisting of polyurethane, silicone, polymethyl methacralate, and polyvinyl acetate; and
h. said polyurethane is dissolved in a solvent and sprayed on the said cylindrical reflective braided sleeve;
whereby said low-density rope exhibits flexibility in combination with abrasion resistance and water shedding properties when exposed to salt water or fresh water floats above water line and omnidirectionally reflects incoming light due to water shedding properties and is operative to delineate or otherwise increase visibility thereof.

2. An omnidirectionally reflective rope as recited by claim 1, wherein said central cylindrical low-density closed cell polymeric rope core comprises EPDM, Neoprene, SBR, NBR, EVA, PVC, PVC/NBR foam.

3. An omnidirectionally reflective rope as recited by claim 1, wherein said cylindrical reflective braided sleeve is braided at a braid angle of 5 to 10 degrees.

4. An omnidirectionally reflective rope as recited by claim 1, wherein each of said narrow width reflective strips has a width of 0.0065 to 0.25 inches.

5. An omnidirectionally reflective rope as recited by claim 1, wherein said flexible retroreflective sheet is thermally bonded to said nylon mesh strip with polyvinyl chloride.

6. An omnidirectionally reflective rope as recited by claim 1, wherein said flexible retroreflective sheet is thermally bonded to said nylon mesh strip with polyvinyl acetate.

7. An omnidirectionally reflective rope as recited by claim 1, wherein said flexible retroreflective sheet is thermally bonded to said nylon mesh strip with polyurethane.

8. An omnidirectionally reflective rope as recited by claim 1, wherein said flexible retroreflective sheet comprises a plurality of corner cube retroreflectors.

9. An omidirectionally reflective rope as recited by claim 1, wherein said flexible retroreflective sheet comprises a plurality of microsphere retroreflectors bonded to a light-reflecting sheet.

10. An omnidirectionally reflective rope as recited by claim 1, wherein said flexible retroreflective sheet comprises a plurality of wide angle, exposed retroreflective lenses bonded to a heat activated polyurethane adhesive.

11. An omnidirectionally reflective rope as recited by claim 10, wherein said flexible retroreflective sheet comprises a plurality of wide angle, exposed retroreflective lenses bonded to a durable cloth backing.

12. An omnidirectionally reflective rope as recited by claim 1, wherein said retroreflectors have a refractive index in the range of 1.9 to 2.2.

13. An omnidirectionally reflective rope as recited by claim 1, wherein said transparent polymeric abrasion resistant water shedding coating has a refractive index in the range of 1.3 to 1.55.

14. An omnidirectionally reflective rope as recited by claim 1, wherein said transparent polymeric abrasion resistant water shedding coating has a thickness in the range of 0.002 to 0.010 inches.

15. An omnidirectionally reflective rope, comprising:
  a. a central cylindrical low-density polymeric closed cell foam core operable to float over water for a prolonged time;
  b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
  c. said cylindrical reflective braided sleeve being substantially coated with a conformal transparent polymeric abrasion resistant water shedding coating;
  d. said narrow width reflective strips comprising a woven or knitted narrow width strip and a flexible nylon retroreflective sheet sewn thereon, said woven or knitted narrow width strip having a show surface, said flexible retroreflective nylon sheet comprising a flexible retroreflective sheet thermally bonded onto a nylon mesh strip, said nylon mesh strip being sewn onto said show surface of said narrow width reflective strip;
  e. said flexible retroreflective sheet having retroreflectors bonded thereto with a transparent bond layer;
  f. said transparent polymeric abrasion resistant water shedding coating having a refractive index lower than that of said retroreflectors;
  g. said transparent polymeric abrasion resistant water shedding coating polymer is a member selected from the group consisting of polyurethane, silicone, polymethyl methacralate, and polyvinyl acetate; and
  h. said silicone comprises a silicone composition having a viscosity in the range of 100-275 CPS;
  whereby said low-density rope exhibits flexibility in combination with abrasion resistance and water shedding properties when exposed to salt water or fresh water floats above water line and omnidirectionally reflects incoming light due to water shedding properties and is operative to delineate or otherwise increase visibility thereof.

16. An omnidirectionally reflective rope as recited by claim 15, wherein said central cylindrical low-density closed cell polymeric rope core comprises EPDM, Neoprene, SBR, NBR, EVA, PVC, PVC/NBR foam.

17. An omnidirectionally reflective rope as recited by claim 15, wherein said flexible retroreflective sheet is thermally bonded to said nylon mesh strip with polyvinyl chloride.

18. An omnidirectionally reflective rope as recited by claim 15, wherein said flexible retroreflective sheet is thermally bonded to said nylon mesh strip with polyvinyl acetate.

19. An omnidirectionally reflective rope as recited by claim 15, wherein said flexible retroreflective sheet is thermally bonded to said nylon mesh strip with polyurethane.

20. An omnidirectionally reflective rope as recited by claim 15, wherein said transparent polymeric abrasion resistant water shedding coating has a refractive index in the range of 1.3 to 1.55.

* * * * *